Patented Dec. 16, 1952

2,622,057

UNITED STATES PATENT OFFICE 2,622,057

METHOD OF SOLUBILIZING COAL TAR SOLUTION

Albert Augenblick, West Philadelphia, Pa., assignor to Sharp & Dohme, Incorporated, Philadelphia, Pa., a corporation of Maryland No Drawing. Application December 18, 1950, Serial No. 201,494

2 Claims. (Cl. 167—58)

This invention relates to coal tar solution and more particularly to a method of solubilizing coal tar solution so as to leave a clear solution when diluted with water.

Coal tar solution as prepared according to the National Formulary is composed of coal tar, U. S. P., quillaja and alcohol, there being 200 grams of coal tar, 100 grams of quillaja and enough alcohol to make 1000 cc. of solution, in the original solution which is a reddish orange, opalescent liquid.

In the pharmaceutical and medicinal field coal tar solution is used for the treatment of various skin conditions as for example pruritis, psoriasis and eczema. When so employed, it is diluted with nine parts of water. This dilution results in the formation of a dense, yellowish-brown precipitate that remains in colloidal dispersion indefinitely, giving to the solution a muddy, opaque appearance. This diluted preparation has distinct disadvantages in addition to its poor appearance. For example, when applied topically to the skin it leaves a heavy, sticky residue. Also in the preparation of ointments containing coal tar solution as a constituent the diluted preparation is not entirely satisfactory in that it does not blend well with the constituents of the usual ointment bases so that there is difficulty in obtaining uniform distribution of the medicament in such ointments.

The object of the present invention is to provide a method of solubilizing coal tar solution so that when it is diluted with water it will give a clear solution.

It has been discovered, in accordance with the present invention, that if a small amount of cetyl dimethyl-ethyl ammonium halide such as the bromide, chloride or iodide is added to coal tar solution prior to dilution of the solution with water, the aforementioned precipitation does not occur but instead a clear solution is obtained. The clarity of the solution increases with an increase in the amount of cetyl dimethyl-ethyl ammonium halide added until, with the addition of a sufficient amount of the salt, a perfectly clear solution is obtained. It has been found that as little as 0.05 gram of cetyl dimethyl-ethyl ammonium halide per cc. of solution will increase the clarity of the original solution on dilution with water and a concentration of 0.150 gram of salt per cc. of solution will render the solution clear on dilution. The solution may then be diluted to infinity without fear of precipitation. It has been found that the addition of an amount of salt in excess of 0.2 gram per cc. of solution is needless since the solution is perfectly clear at that concentration. Thus it will be seen that the range is from 0.05 gram to 0.2 gram of salt per cc. of solution with an optimum range at 0.150 gram of salt per cc. of solution. A solution which has been rendered clear by the method of this invention will retain its clarity for at least a year and probably indefinitely.

The effect herein described is especially unexpected and surprising when the heterogeneous nature of coal tar is considered, this substance containing at least 26 constituents possessing practically every organic grouping known so that it is impossible to establish any one empirical formula for it based on the predominance of a single compound.

The invention herein described may be illustrated by the following representative example although it is not intended that it should be limited thereto:

Example

To a liter of coal tar solution prepared according to the National Formulary add 200 grams of cetyl dimethyl-ethyl ammonium bromide. Dilute with nine times the volume of water. The product is a clear reddish brown solution.

The product of this invention has definite advantages over the original product. It is a clear, reddish-brown solution rather than the muddy, opaque suspension formerly obtained. This is of importance in a therapeutic preparation from the psychological point of view of overcoming a patient's natural antipathy to the employment of a medicament which offends his aesthetic sense because of its unsightly appearance. In the present instance such antipathy is aggravated by the fact that the original preparation, when diluted and applied to the skin, leaves a heavy, sticky, residue. The product of this invention leaves no such residue but only a thin film of the medicament.

Another important advantage of this invention is that a spray type of preparation for application with an atomizer can be prepared easily with the product herein described, whereas this type of preparation cannot be made with the original preparation due to the presence of the precipitate therein. Also the preparation herein described blends well with the constituents of the usual ointment bases and makes a product which allows for a uniform distribution of coal tar when the ointment is properly applied topically.

Finally, cetyl dimethyl-ethyl ammonium halides are themselves germicidal so that by their employment herein the germicidal and therapeutic properties of the original solution are increased.

Having thus particularly described the invention, what is claimed is:

1. A composition comprising coal tar solution and, as a solubilizing agent therefor, a cetyl dimethyl-ethyl ammonium halide, the coal tar solution including coal tar, quillaja and ethanol and the said solubilizing agent being present at least in the amount of 0.05 gram per cubic centimeter of coal tar solution, said composition being a concentrate which upon subsequent dilution with water yields a clear aqueous solution.

2. An aqueous coal tar preparation comprising coal tar solution, a cetyl dimethyl-ethyl ammonium halide as a solubilizing agent and water, the coal tar solution including coal tar, quillaja and ethanol and the solubilizing agent being present at least in the amount of 0.05 gram per cubic centimeter of coal tar solution, whereby a clear, aqueous solution is obtained.

ALBERT AUGENBLICK.

REFERENCES CITED

The following references are of record in the file of this patent:

UNITED STATES PATENTS

| Number | Name | Date |
| --- | --- | --- |
| 2,295,504 | Shelton | Sept. 8, 1942 |

OTHER REFERENCES

Bull. Nat. Form. Committee, volume XV, Numbers 9 and 10, September to October 1947, pages 172 to 176.

Phillips—Am. Soc. of Hospital Pharmacists, volume 6 (1949), page 118.